(12) United States Patent
Tseng

(10) Patent No.: US 12,316,156 B2
(45) Date of Patent: May 27, 2025

(54) METHOD FOR CHARGING A BATTERY AND TERMINAL

(71) Applicant: BEIJING XIAOMI MOBILE SOFTWARE CO., LTD., Beijing (CN)

(72) Inventor: Yaoyi Tseng, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 676 days.

(21) Appl. No.: 17/564,517

(22) Filed: Dec. 29, 2021

(65) Prior Publication Data

US 2022/0352740 A1 Nov. 3, 2022

(30) Foreign Application Priority Data

Apr. 30, 2021 (CN) .......................... 202110483514.7

(51) Int. Cl.
*H02J 7/00* (2006.01)
(52) U.S. Cl.
CPC ...... *H02J 7/007192* (2020.01); *H02J 7/0049* (2020.01)
(58) Field of Classification Search
CPC .................. H02J 7/007192; H01M 10/443
See application file for complete search history.

(56) References Cited

U.S. PATENT DOCUMENTS

| | | | | |
|---|---|---|---|---|
| 2015/0364941 A1* | 12/2015 | Widmer | ................ | H02J 7/0063 713/300 |
| 2017/0222465 A1* | 8/2017 | Hawley | ................. | H02J 7/0013 |
| 2021/0237900 A1* | 8/2021 | Higuchi | ................. | B64D 25/00 |

FOREIGN PATENT DOCUMENTS

| | | |
|---|---|---|
| CN | 105207307 A | 12/2015 |
| CN | 105322603 A | 2/2016 |
| CN | 105207307 B | 7/2018 |
| CN | 108621829 A | 10/2018 |
| WO | WO 2011122946 A1 | 10/2011 |

OTHER PUBLICATIONS

European Patent Application No. 21218201.8, Search and Opinion dated Jul. 22, 2022, 12 pages.
Anonymous "BU-410: Charging at High and Low Temperatures" Apr. 2, 2021; 12 pages.
Chinese Patent Application No. 202110483514.7, Office Action dated Jun. 22, 2024, 10 pages.
Chinese Patent Application No. 202110483514.7, English translation of Office Action dated Jun. 22, 2024, 12 pages.

* cited by examiner

*Primary Examiner* — Richard Isla
*Assistant Examiner* — Ryu-Sung P. Weinmann
(74) *Attorney, Agent, or Firm* — Cozen O'Connor

(57) ABSTRACT

A method for charging a battery, includes: detecting current geographic location information and current time information of the terminal; determining a current temperature characteristic of an environment where the terminal is currently located according to the current geographic location information and the current time information; determining a target full charging voltage matching the current temperature characteristic, and charging a battery of the terminal with the target full charging voltage, in which different full charging voltages match with different temperature characteristics.

15 Claims, 6 Drawing Sheets finding a target time period related to a first temperature characteristic corresponding to the current geographic location information from a preset correspondence between geographic location information and time periods related to the first temperature characteristic, wherein the correspondence between the geographic location information and the time periods related to the first temperature characteristic indicates that a region corresponding to each piece of geographic location information is in an environment having the first temperature characteristic during the corresponding time period related to the first temperature characteristic — S501

↓ determining whether the current time information matches the target time period related to the first temperature characteristic — S502

↓ in a case that the current time information matches the target time period related to the first temperature characteristic, determining that the current temperature characteristic of the environment where the terminal is currently located is the first temperature characteristic; otherwise, determining that the current temperature characteristic of the environment where the terminal is currently located is a second temperature characteristic — S503

METHOD FOR CHARGING A BATTERY AND TERMINAL

CROSS REFERENCE TO RELATED APPLICATION

This application is based on and claims priority to Chinese patent application No. 202110483514.7 filed on Apr. 30, 2021, the content of which is incorporated herein by reference.

TECHNICAL FIELD

The present disclosure relates to a technical field of terminals, and more particularly, to a method for charging a battery and a terminal.

BACKGROUND

Battery life of a terminal is an important factor that a user considers when selecting the terminal. Battery life is an inherent property of the battery. The nature of the battery will change as the battery is being used, causing the battery life to become shorter and shorter, and eventually to a point where the user has to replace the terminal.

SUMMARY

The present disclosure provides a method for charging a battery and a terminal to solve problems in the art.

In a first aspect of embodiments of the present disclosure, a method for charging a battery is provided. The method is applicable for a terminal, and includes:
detecting current geographic location information and current time information of the terminal;
determining a current temperature characteristic of an environment where the terminal is currently located according to the current geographic location information and the current time information;
determining a target full charging voltage matching the current temperature characteristic, and charging a battery of the terminal with the target full charging voltage, in which different full charging voltages match with different temperature characteristics.

In a second aspect of embodiments of the present disclosure, a terminal is provided. The terminal includes: a processor; a memory for storing instructions executable by the processor. When the instructions executed by the processor, a method for charging a battery is implemented and the processor is configured to, detect current geographic location information and current time information of the terminal; determine a current temperature characteristic of an environment where the terminal is currently located according to the current geographic location information and the current time information; determine a target full charging voltage matching the current temperature characteristic, and charge a battery of the terminal with the target full charging voltage, in which different full charging voltages match with different temperature characteristics.

In a third aspect of embodiments of the present disclosure, a non-transitory computer readable storage medium having a computer program stored thereon is provided. The program is configured to cause a processor to execute a method for charging a battery, and the method includes: detecting current geographic location information and current time information of the terminal; determining a current temperature characteristic of an environment where the terminal is currently located according to the current geographic location information and the current time information; determining a target full charging voltage matching the current temperature characteristic, and charging a battery of the terminal with the target full charging voltage, in which different full charging voltages match with different temperature characteristics.

It should be understood that the above general description and the following detailed description are only exemplary and explanatory, and do not limit the present disclosure.

BRIEF DESCRIPTION OF THE DRAWINGS

The drawings herein are incorporated into the specification and constitute a portion of the specification, and illustrate the embodiments consistent with the disclosure, and used to explain the principle of the disclosure with the specification.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The present disclosure provides a method and an apparatus for charging a battery, applicable to a terminal. For example, the terminal may be a mobile phone, a pad, or a wearable device, etc.

The present disclosure provides the method and the apparatus for charging the battery and the terminal. Current geographic location information and current time information of the terminal are detected, a current temperature characteristic of an environment where the terminal is currently located is determined according to the current geographic location information and the current time information, and a target full charging voltage matching the current temperature characteristic is determined, and the battery of the terminal is charged with the target full charging voltage. Full charging voltages matching with different temperature characteristics are different. In this way, the full charging voltage matched with the temperature characteristic of the environment where the terminal is located, an impact of an operating environment on a service life of the battery may be reduced and the service life of the battery may be prolonged.

Several specific embodiments are given below to introduce the technical solution of the present disclosure in detail. The following specific embodiments may be combined with each other. Same or similar concepts or processes may not be repeated in some embodiments.

Figure 1:
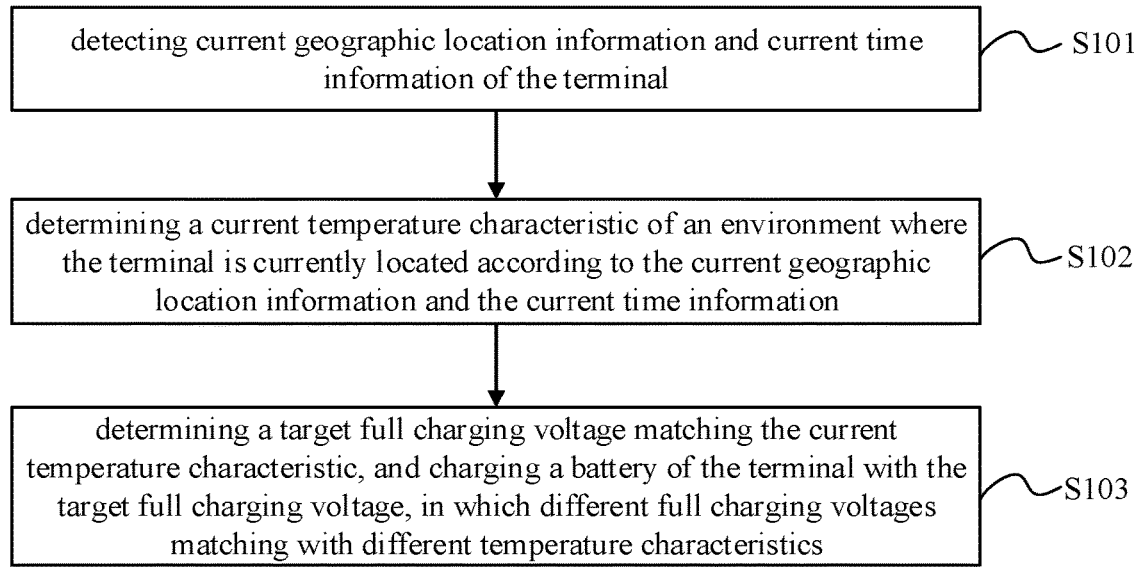
FIG. 1 is a flowchart illustrating a method for charging a battery according to an embodiment of the present disclosure.

FIG. 1 is a flowchart illustrating a method for charging a battery according to an embodiment of the present disclosure. Referring to FIG. 1, the method provided by the present disclosure includes the following blocks.

S101, current geographic location information and current time information of the terminal are detected.

In an embodiment, the current geographical location and the current time information of the terminal may be detected periodically according to a preset cycle time. The preset cycle time may be preset according to actual requirements. In the present disclosure, a specific value of the preset cycle time is not limited. For example, the preset cycle time may be one day.

S102, a current temperature characteristic of an environment where the terminal is currently located is determined according to the current geographic location information and the current time information.

In some embodiments, temperature characteristics of the environment where the terminal is currently located include high temperature and low temperature. In addition, in an embodiment, the current temperature characteristic of the environment where the terminal is currently located may be determined as follows:

(1) Temperature information of a target region indicated by the current geographic location information under the current time information is obtained based on the current geographic location information and the current time information.

(2) The current temperature characteristic of the environment where the terminal is currently located is determined based on the temperature information.

When specifically implemented, the temperature information of the target region under the time information may be obtained from network.

It should be noted that in an embodiment, the temperature information of the target region under the time information may be a maximum temperature under a date attribute corresponding to the time information. For example, the time information is 8:20 on Apr. 15, 2021, and the date attribute corresponding to the time information is Apr. 15, 2021. At this time, the temperature information of the target region under the time information is the maximum temperature of the target region on Apr. 15, 2021.

In another embodiment, the temperature information of the target region under the time information may be an instantaneous temperature under the time information. Combined with the previous example, for example, when the time information is 8:20 on Apr. 15, 2021, the temperature information of the target region under the time information may be the instantaneous temperature of the target region at 8:20 on Apr. 15, 2021.

Further, in a case where the temperature information is the maximum temperature, it may be determined that the current temperature characteristic of the environment where the terminal is currently located is high temperature when the maximum temperature is greater than a first preset threshold, otherwise it may be determined that the current temperature characteristic of the environment where the terminal is currently located is low temperature.

Further, in a case where the temperature information is the instantaneous temperature, it may be determined that the current temperature characteristic of the environment where the terminal is currently located is high temperature when the instantaneous temperature is greater than a second preset threshold, otherwise it may be determined that the current temperature characteristic of the environment where the terminal is currently located is low temperature.

It should be noted that the first preset threshold and the second preset threshold are set according to actual requirements, and may be the same or different. In this embodiment, specific values of the first preset threshold and the second preset threshold are not limited. For example, in one embodiment, both the first preset threshold and the second preset threshold are 30° C.

S103, a target full charging voltage matching the current temperature characteristic is determined, and a battery of the terminal is charged with the target full charging voltage. Different full charging voltages match with different temperature characteristics.

A process of charging the battery may include multiple charging stages, for example, a constant current charging stage, a constant voltage charging stage or a pulse current charge stage. The target full charging voltage may be a target cut-off charging voltage of the constant current charging stage or a target constant charging voltage of the constant voltage charging stage, that is, during the constant current charging stage, the charging process may enter into the constant voltage charging stage in a case that a voltage of the battery reaches the target full charging voltage, and during the constant voltage charging stage, the battery is charged with the target full charging voltage.

In some embodiments, in a case that the temperature characteristic is a first temperature characteristic, the target full charging voltage may be lower than an initial full charging voltage of the battery, and in a case that the temperature characteristic is a second temperature characteristic, the target full charging voltage may be lower than or equal to the initial full charging voltage.

For example, the first temperature characteristic may be a high temperature characteristic. The second temperature characteristic may be a low temperature characteristic. In embodiments of the present disclosure, the "high temperature" means that a temperature higher than a first temperature. The "low temperature" means that a temperature lower than a second temperature, and the second temperature is less than or equal to the first temperature.

Alternatively, in one possible implementation, in a case where the temperature characteristic is the first temperature characteristic, a difference between an initial full charging voltage of the battery and a specified value is determined as the target full charging voltage matching the current temperature characteristic. In a case where the temperature characteristic is the second temperature characteristic, the initial full charging voltage of the battery is determined as the target full charging voltage matching the current temperature characteristic.

It should be noted that the specified value is preset according to actual requirements. In this embodiment, the specified value is not limited. For example, in one embodiment, the specified value may be 20 mV.

A specific example is given below to explain in detail the technical solution of the present disclosure.

For example, in one embodiment, it is detected that the current geographic location information and the current time information of the terminal are: Shenzhen, 8:45 on Aug. 30, 2020, respectively. Further, it is determined that the current temperature characteristic of the environment where the terminal is currently located is the first temperature characteristic. At this time, it is determined that the target full charging voltage is 4.48V (4.48=4.5 (initial full charging voltage of the battery)−0.02), such that during charging the battery, the battery is charged according to the full charging voltage of 4.48V.

Specific principle that charging the battery based on the above method may prolong the service life of the battery is introduced below.

Figure 2:
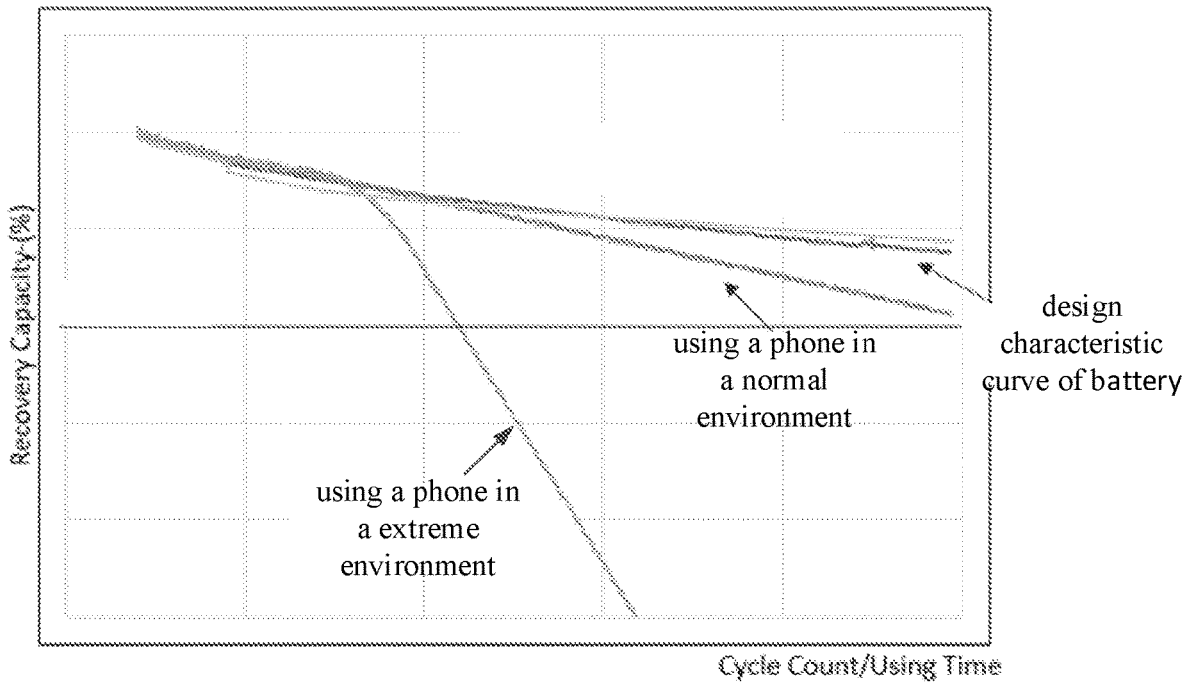
FIG. 2 is a schematic diagram illustrating a characteristic curve of a battery according to an embodiment of the present disclosure.

FIG. 2 is a schematic diagram illustrating a characteristic curve of a battery according to an embodiment of the present disclosure. Referring to FIG. 2, due to environmental factors, the actual service life of the battery is generally lower than a design life of the battery.

Figure 3:
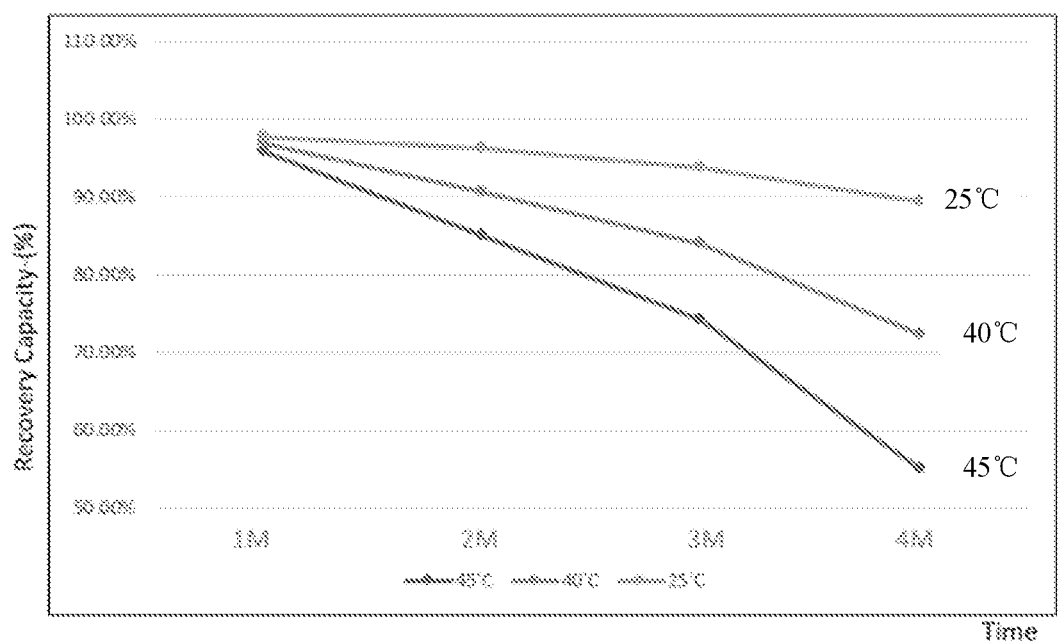
FIG. 3 is a schematic diagram illustrating a relationship between service lives of a battery and storage temperatures of the battery according to an embodiment of the present disclosure.

FIG. 3 is a schematic diagram illustrating a relationship between service lives of a battery and storage temperatures of the battery according to an embodiment of the present disclosure. Referring to FIG. 3, it may be seen that among many environmental factors, a temperature of the environment is a key factor affecting the service life of the battery (it should be noted that in order to obtain a relationship curve between the service life of the battery and the storage temperature of the battery, as illustrated in FIG. 3, a certain type of batteries may be stored at 25° C., 40° C. and 45° C. respectively, and recovery capacity of each battery may be collected at specified intervals (for example, as illustrated in FIG. 3, the recovery capacity of the battery is collected every other month), and then the curve illustrated in FIG. 3 is drawn based on the storage time and the recovery capacity).

Referring to FIG. 3, different temperatures of the environment will affect the service life of the battery to varying degrees. The higher the temperature of the environment, and the shorter the service life of the battery.

Further, it is found that when the temperature of the environment is greater than 30° C., the temperature of the environment will cause material degeneration of a cell and aging of the battery.

Therefore, when an impact of an environment having the high temperature characteristic on the battery life is suppressed, the service life of the battery may be prolonged.

The method provided in embodiments of the present disclosure may cause the full charging voltage matching with the temperature characteristic of the environment where the terminal is located, an impact of an operating environment on the service life of the battery may be reduced and the service life of the battery may be prolonged.

Figure 4:
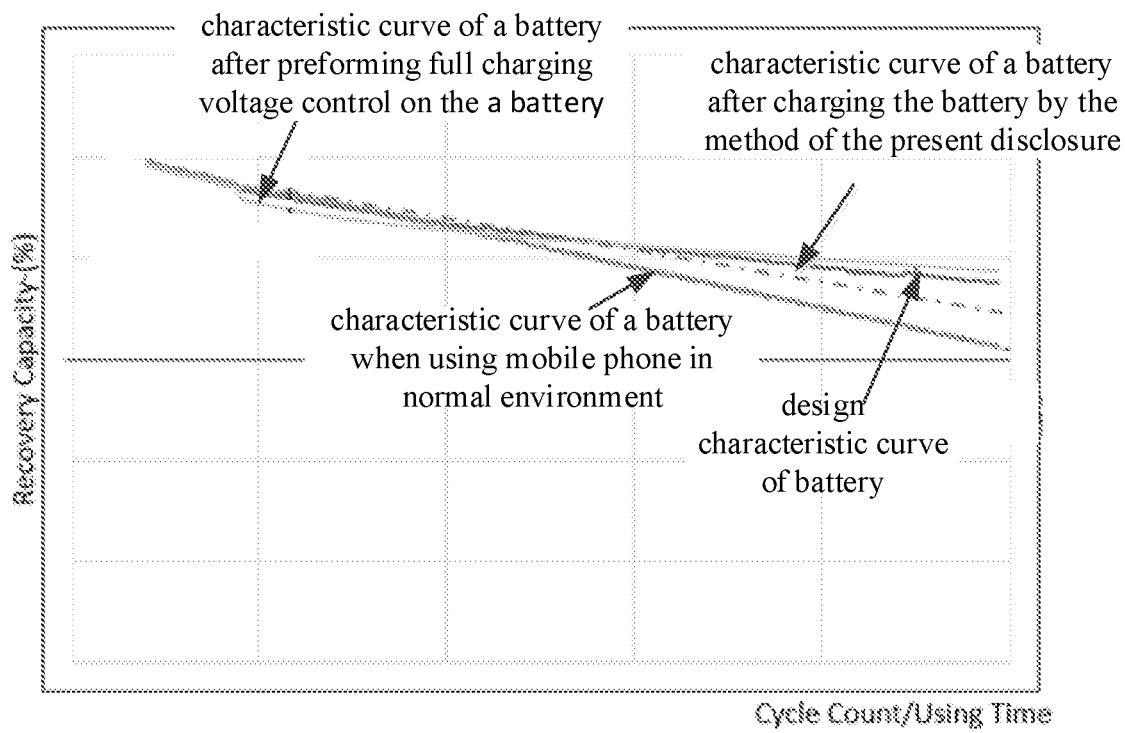
FIG. 4 is a schematic diagram illustrating a characteristic curve of a battery according to another embodiment of the present disclosure.

Further, FIG. 4 is a schematic diagram illustrating a characteristic curve of a battery according to another embodiment of the present disclosure. It should be noted that the characteristic curve of the battery illustrated in FIG. 4 is a curve drawn based on test data. Specifically, for example, in order to obtain a relationship between full charging voltage control (full charge voltage control refers to charging the battery according to a reduced full charging voltage) and the service life of the battery, the full charging voltage of the battery may be reduced, then the battery is charged according to the reduced full charge voltage, the recovery capacity of the battery may be tested at specified intervals, to obtain the recovery capacities under multiple service times, and the relationship curve illustrated in FIG. 4 is drawn based on the recovery capacities under multiple service times (the characteristic curve of the battery after performing the full charging voltage control on the battery in FIG. 4). As can be seen from FIG. 4, when the full charging voltage of the battery is reduced and the battery is charged with the reduced full charging voltage, although the recovery capacity of the battery is reduced in the near future, the service life of the battery is prolonged after long-term cycling.

In addition, referring to FIG. 4, when the battery is charged according to the method provided in the present disclosure (the method for matching the full charging voltage with the temperature characteristic uses a lower full charging voltage at high temperature), the service life of the battery may be prolonged.

The method according to the present disclosure detects the current geographic location information and the current time information of the terminal, determines the current temperature characteristic of the environment where the terminal is currently located according to the current geographic location information and the current time information, and determines the target full charging voltage matching the current temperature characteristic, and charges the battery of the terminal with the target full charging voltage. In this way, the full charging voltage matched with the temperature characteristic of the environment where the terminal is located, an impact of an operating environment on a service life of a battery may be reduced and the service life of the battery may be prolonged.

Alternatively, in a possible implementation of the present disclosure, in a case of determining that the current temperature characteristic of the environment where the terminal is currently located is the first temperature characteristic, the method includes:

reducing power consumption of the terminal to reduce temperature of the terminal.

In some embodiments, reducing the power consumption of the terminal may be realized by adopting related methods, for example, closing unnecessary applications.

The method provided by the embodiment of the present disclosure may reduce the temperature of the terminal by reducing the power consumption of the terminal, so as to prolong the service life of the battery of the terminal.

Figure 5:
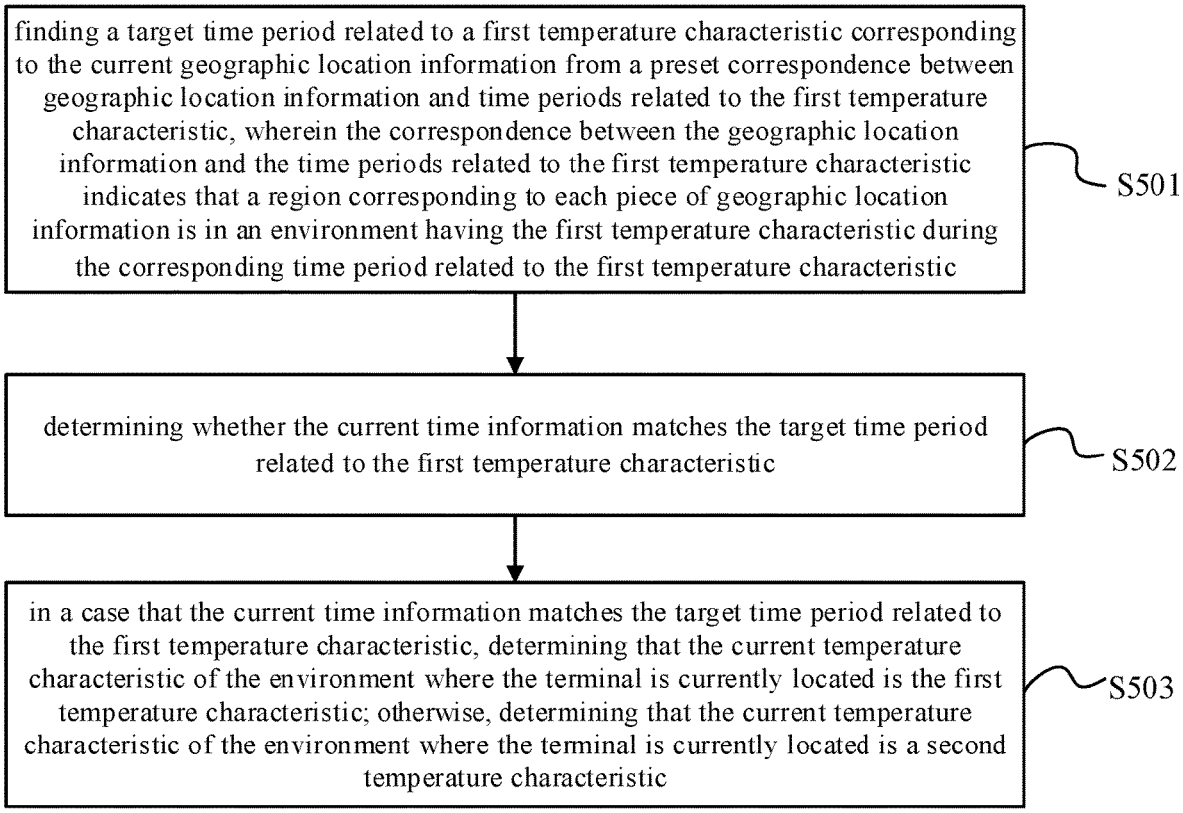
FIG. 5 is a flowchart illustrating a method for charging a battery according to another embodiment of the present disclosure.

FIG. 5 is a flowchart illustrating a method for charging a battery according to another embodiment of the present disclosure. Referring to FIG. 5, the block S102 of the method provided by the present embodiment may include the following blocks.

S501, a target time period of related to the first temperature characteristic corresponding to the current geographic location information is found from a preset correspondence between geographic location information and time periods related to the first temperature characteristic. The correspondence between the geographic location information and the time periods related to the first temperature characteristic indicates that a region corresponding to each piece of geographic location information is in an environment having the first temperature characteristic during the corresponding time period related to the first temperature characteristic.

In some embodiments, the correspondence between the geographic location information and the time periods related to the first temperature characteristic indicates that the region corresponding to each piece of geographic location information is in the environment having the first temperature characteristic during the corresponding time period related to the first temperature characteristic. In addition, the correspondence between the geographic location information and the time periods related to the first temperature characteristic is set according to actual requirements. In this embodiment, specific content of which is not limited. For example, Table 1 illustrates the correspondence between the geographic location information and the time periods related to the high temperature characteristic according to an exemplary embodiment:

TABLE 1

| geographic location information | time periods related to the high temperature characteristic |
|---|---|
| Shenzhen | May to September each year |
| Harbin | July each year |
| Taiyuan | July and August each year |
| ... | ... |

Combined with Table 1, for example, in an embodiment, it is detected that the current geographic location information and the current time information of the terminal are Taiyuan and 9:00 on Jul. 5, 2020 respectively. At this time, it is found that the target time period related to the high temperature characteristic corresponding to Taiyuan is July and August.

In some embodiments, the correspondence may be stored locally or in a cloud server. When the correspondence is stored in the cloud server, prior to finding the target time period related to the first temperature characteristic corresponding to the current geographic location information from the preset correspondence between the geographic location information and the time periods related to the first temperature characteristic, it may be determined that the correspondence is stored locally, and then in response to the correspondence relationship not being stored locally, obtaining and storing the correspondence from a cloud server S502, it is determined whether the current time information matches the target time period related to the first temperature characteristic.

In some embodiments, when the current time information is in the time period related to the first temperature characteristic, it is considered that the current time information matches the target time period related to the first temperature characteristic. Otherwise, it is considered that the current time information does not match the target time period related to the first temperature characteristic.

Combined with the above example, it is detected that the time information is 9:00 on Jul. 5, 2020, and it is found that the target time period related to the high temperature characteristic is July and August of each year. At this time, it is determined that the current time information matches the target time period related to the high temperature characteristic.

S503, in a case that the current time information matches the target time period related to the first temperature characteristic, it is determined that the current temperature characteristic of the environment where the terminal is currently located is the first temperature characteristic. In a case that the current time information does not match the target time period related to the first temperature characteristic, it is determined that the current temperature characteristic of the environment where the terminal is currently located is the second temperature characteristic.

Combined with the above example, it is determined that the current temperature characteristic of the environment where the terminal is currently located is the high temperature characteristic. For another example, in another embodiment, it is detected that the geographic location information and the time information are: Shenzhen, at 15:00 on Apr. 24, 2020, respectively. Further, combined with table 1, it is found that the target time period related to the high temperature characteristic is from May to September every year. At this time, it is determined that the above time information does not match the target time period related to the high temperature characteristic, and it is determined that the current temperature characteristic of the environment where the terminal is currently located is the low temperature characteristic.

The method provided in this embodiment determines the temperature characteristics of the current environment of the terminal based on the preset correspondence between the geographical location information and the time periods related to the first temperature characteristic, and charges the battery based on the reduced full charge pressure when the temperature characteristics of the current environment of the terminal are the first temperature characteristic, and when the temperature characteristics of the current environment of the terminal are the second temperature characteristic, The battery is charged based on the initial full charge voltage. In this way, the service life of the battery may be extended.

Figure 6:
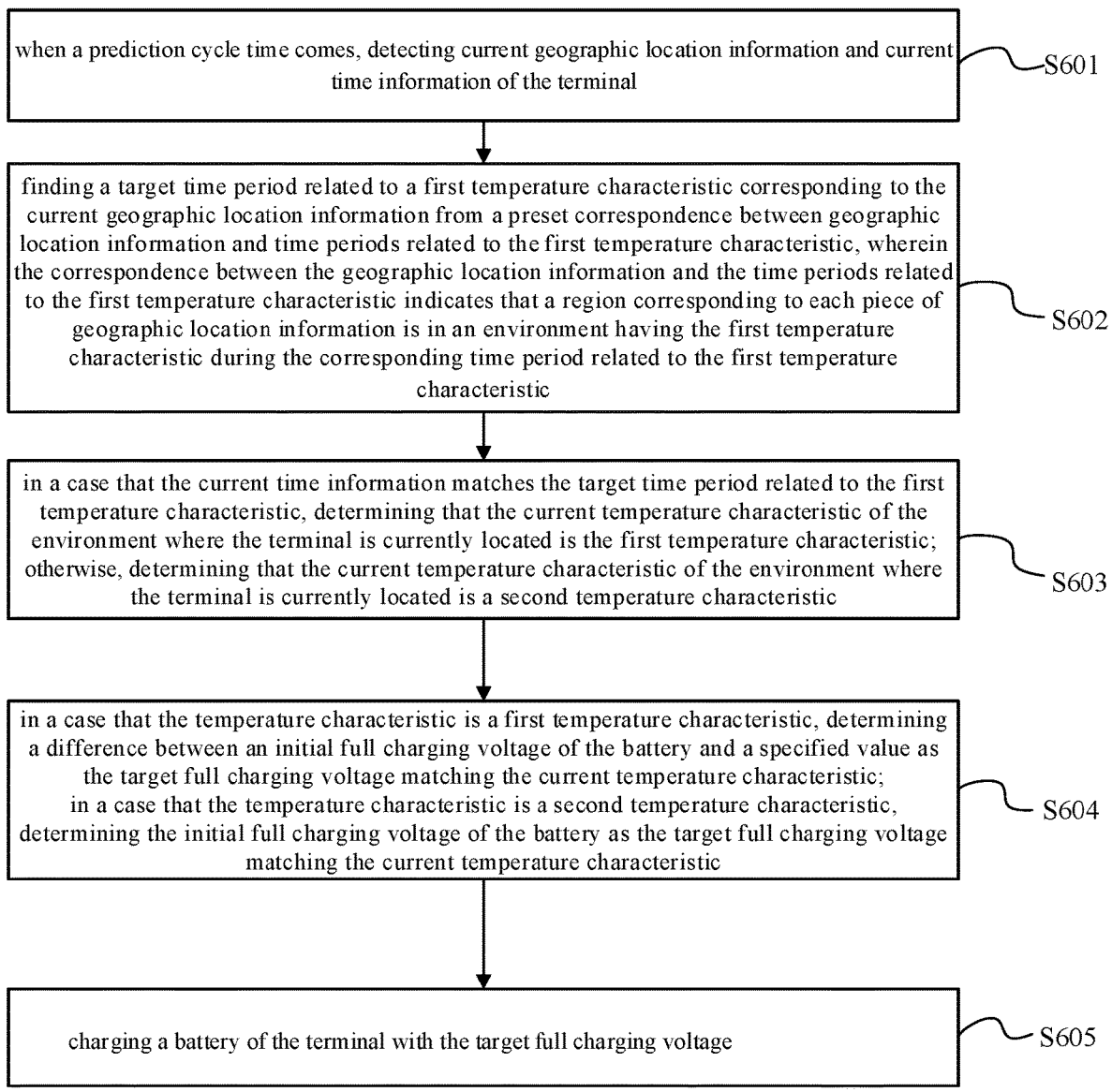
FIG. 6 is a flowchart illustrating a method for charging a battery according to yet another embodiment of the present disclosure.

FIG. 6 is a flowchart illustrating a method for charging a battery according to yet another embodiment of the present disclosure. Referring to FIG. 6, in the embodiment illustrated in FIG. 6, the method may include the following blocks.

S601, when a prediction cycle time comes, current geographic location information and time information of the terminal are detected.

S602, a target time period related to the first temperature characteristic corresponding to the current geographic location information is found from a preset correspondence between geographic location information and time periods related to the first temperature characteristic. The correspondence between the geographic location information and the time periods related to the first temperature characteristic indicates that a region corresponding to each piece of geographic location information is in an environment having the first temperature characteristic during the corresponding time period related to the first temperature characteristic.

S603, in a case that the current time information matches the target time period related to the first temperature characteristic, it is determined that the current temperature characteristic of the environment where the terminal is currently located is the first temperature characteristic. In a case that the current time information does not match the target time period related to the first temperature characteristic, it is determined that the current temperature characteristic of the environment where the terminal is currently located is the second temperature characteristic.

S604, in a case that the temperature characteristic is the first temperature characteristic, a difference between an initial full charging voltage of the battery and a specified value is determined as the target full charging voltage matching the current temperature characteristic. In a case that the temperature characteristic is the second temperature characteristic, the initial full charging voltage of the battery is determined as the target full charging voltage matching the current temperature characteristic.

S605, the battery of the terminal is charged with the target full charging voltage.

Details about implementation principle and implementation process of the blocks S601 to S605 may refer to descriptions in the relevant arts, which will not be repeated here.

The method according to the present disclosure detects the current geographic location information and the current time information of the terminal, determines the current temperature characteristic of the environment where the terminal is currently located according to the current geographic location information and the current time information, and determines the target full charging voltage matching the current temperature characteristic, and charges the battery of the terminal with the target full charging voltage. In this way, the full charging voltage matched with the temperature characteristic of the environment where the terminal is located, an impact of an operating environment on a service life of the battery may be reduced and the service life of the battery may be prolonged.

Corresponding to the aforementioned embodiments of the method for charging the battery, the embodiments of the present disclosure also provides embodiments of an apparatus for charging the battery.

Figure 7:
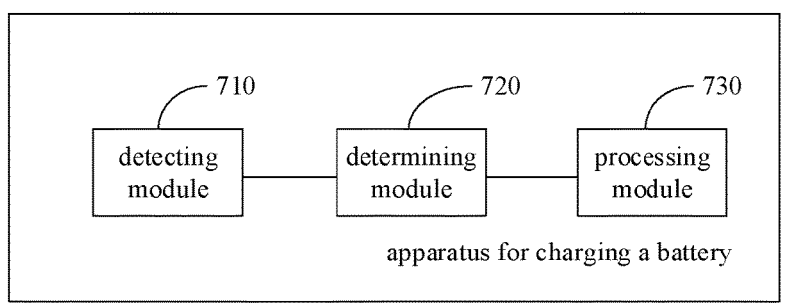
FIG. 7 is a block diagram illustrating an apparatus for charging a battery according to an embodiment of the present disclosure.

FIG. 7 is a block diagram illustrating an apparatus for charging a battery according to an embodiment of the present disclosure. Referring to FIG. 7, the apparatus provided by the present disclosure is applicable for a terminal and includes a detecting module 710, a determining module 720 and a processing module 730.

The detecting module 710 is configured to detect current geographic location information and current time information of the terminal.

The determining module 720 is configured to determine a current temperature characteristic of an environment where the terminal is currently located according to the current geographic location information and the current time information.

The processing module 730 is configured to determine a target full charging voltage matching the current temperature characteristic, and charge a battery of the terminal with the target full charging voltage. Different full charging voltages match with different temperature characteristics.

The apparatus of this embodiment may be configured to execute the technical solution according to embodiments of the method illustrated in FIG. 1, both of which have similar implementation principle and technical effect, and will not be repeated here.

In some embodiments, the processing module 730 is configured to, in a case that the temperature characteristic is a first temperature characteristic, determine a difference between an initial full charging voltage of the battery and a specified value as the target full charging voltage matching the current temperature characteristic; in a case that the temperature characteristic is a second temperature characteristic, determine the initial full charging voltage of the battery as the target full charging voltage matching the current temperature characteristic.

Figure 8:
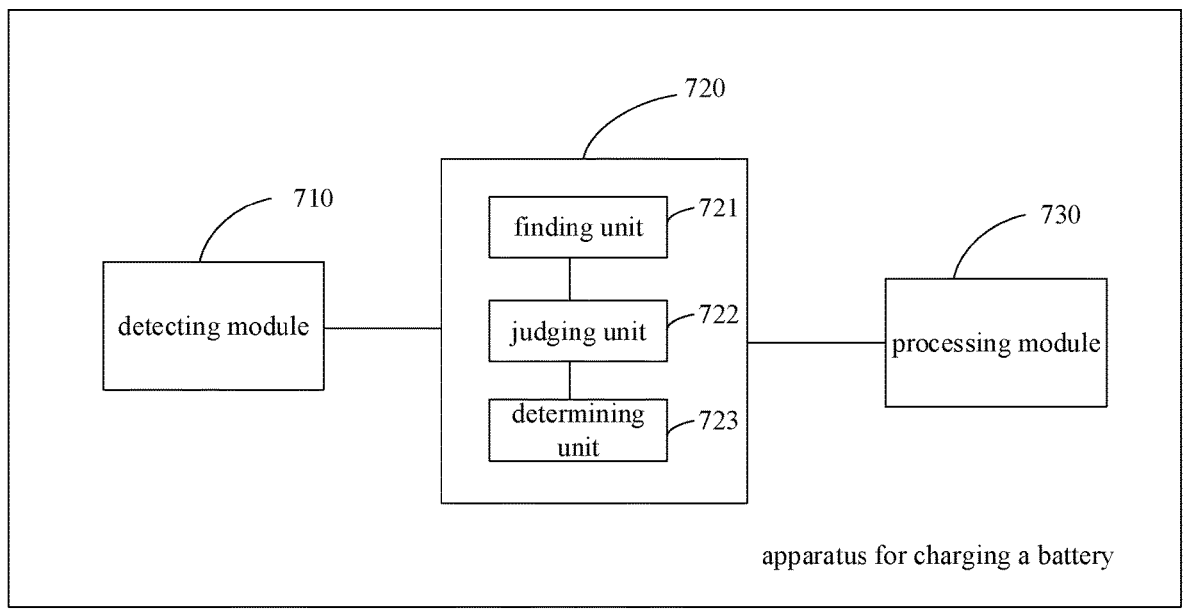
FIG. 8 is a block diagram illustrating an apparatus for charging a battery according to another embodiment of the present disclosure.

FIG. 8 is a block diagram illustrating an apparatus for charging a battery according to another embodiment of the present disclosure. Referring to FIG. 8, on the basis of the above embodiments, in the apparatus for charging a battery provided by embodiments of the present disclosure, the determining module 720 includes a finding unit 721, a judging unit 722 and a determining unit 723.

The finding unit 721 is configured to find a target time period related to the first temperature characteristic corresponding to the current geographic location information from a preset correspondence between geographic location information and time periods related to the first temperature characteristic. The correspondence between the geographic location information and the time periods related to the first temperature characteristic indicates that a region corresponding to each piece of geographic location information is in an environment having the first temperature characteristic during the corresponding time period related to the first temperature characteristic.

The judging unit 722 is configured to determine whether the current time information matches the target time period related to the first temperature characteristic.

The determining unit 723 is configured to, in a case that the current time information matches the target time period related to the first temperature characteristic, determine that the current temperature characteristic of the environment where the terminal is currently located is the first temperature characteristic; in a case that the current time information does not match the target time period related to the first temperature characteristic, determine that the current temperature characteristic of the environment where the terminal is currently located is the second temperature characteristic.

In some embodiments, the judging unit 722 is further configured to, prior to finding, by the finding unit 721, the target time period related to the first temperature characteristic corresponding to the current geographic location information from the preset correspondence between the geographic location information and the time periods related to the first temperature characteristic, determine whether the correspondence is stored locally.

The finding unit 722 is further configured to, in response to the correspondence not being stored locally, obtaining and storing the correspondence from a cloud server.

In some embodiments, the determining module 720 is configured to obtain temperature information of a target region indicated by the current geographic location information under the current time information based on the current geographic location information and the current time information; determine the current temperature characteristic of the environment where the terminal is currently located based on the temperature information.

In some embodiments, the processing module 730 is configured to, in a case that the determining module 720 determines that the current temperature characteristic of the environment where the terminal is currently located is the first temperature characteristic, reduce power consumption of the terminal to reduce temperature of the terminal.

Regarding the apparatus in the foregoing embodiment, the specific manner in which each module performs the operation has been described in detail in the embodiment of the method, and detailed description is not given here.

The apparatus embodiments generally correspond to the method embodiments, and relevant part could be referred to the part of the description of the method embodiments. The apparatus embodiments described above are merely illustrative, where the units described as separate components may or may not be physically separated, and the components displayed as units may or may not be physical units, that is, the units may be located in one place, or distributed to a plurality of network units. Some or all of the modules are selected according to actual needs to achieve the objectives of the solution of the present disclosure. Those of ordinary skill in the art may understand and implement the technical solution without inventive works.

Embodiments of the present disclosure also provide a terminal. The terminal includes a processor and a memory for storing instructions executable by the processor.

The processor is configured to execute the method according to any one of the above embodiments.

Embodiments of the present disclosure also provide a non-transitory computer readable storage medium having a computer program stored thereon. The program is configured to cause a processor to execute the method according to any one of the above embodiments.

Figure 9:
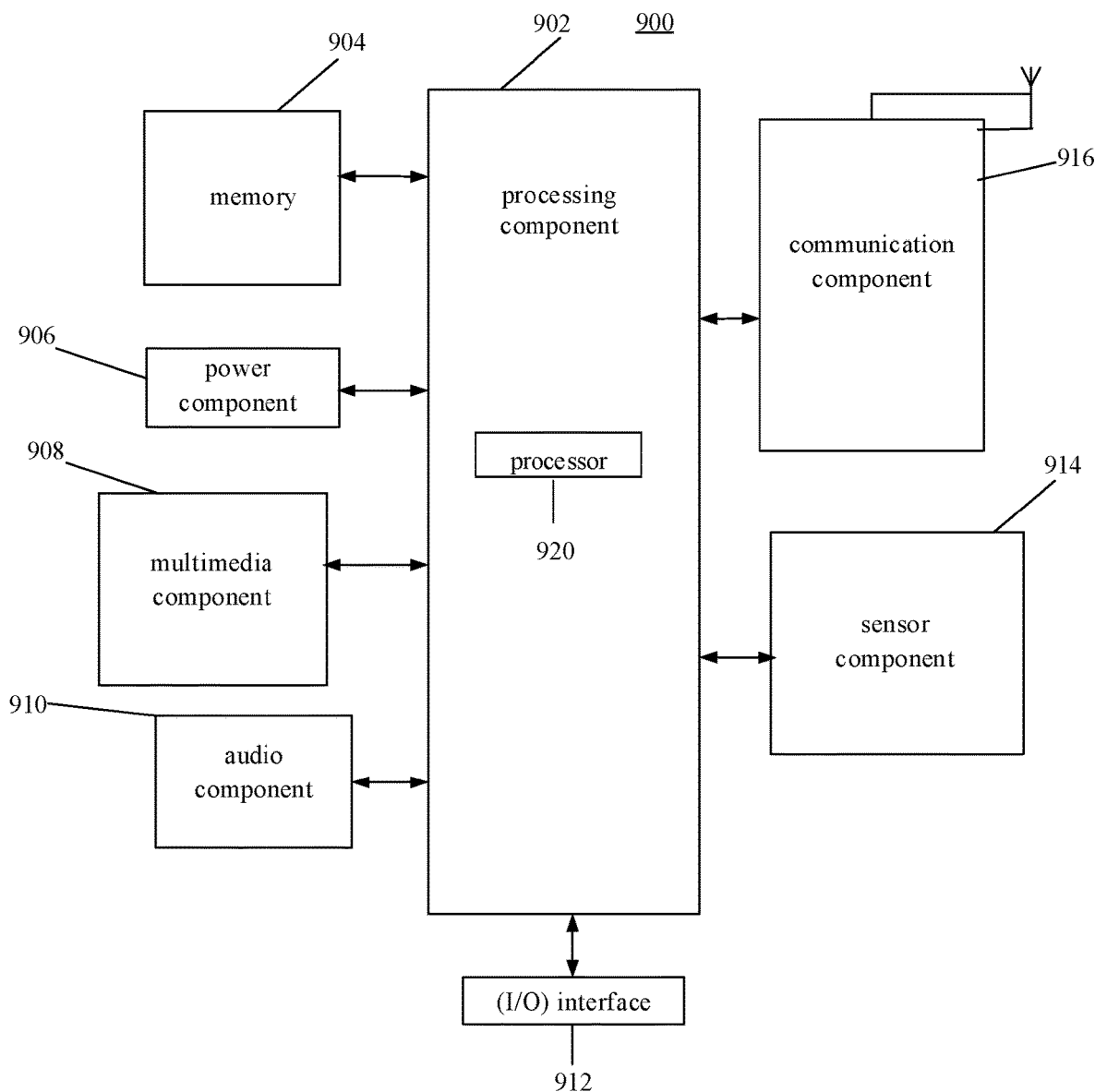
FIG. 9 is a block diagram illustrating a terminal according to an embodiment of the present disclosure.

FIG. 9 is a block diagram illustrating a terminal according to an embodiment of the present disclosure. For example, the terminal 900 may be a mobile phone, a computer, a digital broadcasting terminal, a messaging device, a game console, a tablet device, a medical device, a fitness device, and a personal digital assistant.

As illustrated in FIG. 9, the terminal 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the apparatus 900, such as the operations associated with display, telephone calls, data communications, camera operations, and recording operations. The processing component 902 may include one or more processors 1020 to execute instructions to perform all or part of the steps in the above described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the apparatus 900. Examples of such data include instructions for any applications or methods operated on the apparatus 900, contact data, phonebook data, messages, pictures, video, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the apparatus 900. The power component 906 may include a power management system, one or more power sources, and any other components associated with the generation, management, and distribution of power in the apparatus 900.

The multimedia component 908 includes a screen providing an output interface between the apparatus 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. When the apparatus 900 is in an operation mode, such as a shooting mode or a video mode, the front camera and/or the rear camera may receive external multimedia data. Each front camera and rear camera can be a fixed optical lens system or have focal length and optical zoom capabilities.

The audio component 910 is configured to output and/or input audio signals. For example, the audio component 910 includes a microphone ("MIC") configured to receive an external audio signal when the apparatus 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like. The buttons may include, but are not limited to, a home button, a volume button, a starting button, and a locking button.

The sensor component 914 includes one or more sensors to provide status assessments of various aspects of the apparatus 900. For instance, the sensor component 914 may detect an open/closed status of the apparatus 900, relative positioning of components, e.g., the display and the keypad, of the apparatus 900, a change in position of the apparatus 900 or a component of the apparatus 900, a presence or absence of user contact with the apparatus 900, an orientation or an acceleration/deceleration of the apparatus 900, and a change in temperature of the apparatus 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may further include an acceleration sensor, a gyro sensor, a magnetic sensor, a pressure sensor, or a temperature sensor.

The communication component 916 is configured to facilitate communication, wired or wirelessly, between the apparatus 900 and other devices. The apparatus 900 can access a wireless network based on a communication standard, such as Wi-Fi, 2G, or 3G, or a combination thereof. In one exemplary embodiment, the communication component 916 receives a broadcast signal or broadcast associated information from an external broadcast management system via a broadcast channel. In one exemplary embodiment, the communication component 916 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the terminal 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In an exemplary embodiment, a storage medium including instructions is provided, such as the memory 904 including instructions, and the foregoing instructions may be executed by the processor 920 of the terminal 900 to complete the foregoing method.

Optionally, the storage medium may be a non-transitory computer-readable storage medium, for example, the non-transitory computer-readable storage medium may be a ROM, a random access memory (RAM), a CD-ROM, a magnetic tape, a floppy disk, and an optical data storage device.

Those skilled in the art easily think of other embodiments of the present disclosure after considering the description and practicing the disclosure disclosed herein. This disclosure is intended to cover any variations, uses, or adaptive changes that follow the general principles of this disclosure and include common general knowledge or customary technical means in the technical field not disclosed in this disclosure. The description and examples are to be considered exemplary only, and the true scope and spirit of this disclosure are disclosured by the claims.

It should be understood that the present disclosure is not limited to the precise structure that has been described above and shown in the drawings, and various modifications and changes can be made without departing from the scope thereof. The scope of the present disclosure is limited only by the appended claims.

What is claimed is:

1. A method for charging a battery, applicable to a terminal, the method comprising:
    detecting current geographic location information and current time information of the terminal;
    determining a current temperature characteristic of an environment where the terminal is currently located according to the current geographic location information and the current time information;
    determining a target full charging voltage matching the current temperature characteristic, and charging a battery of the terminal with the target full charging voltage, wherein different full charging voltages match with different temperature characteristics;
    wherein determining the current temperature characteristic of the environment where the terminal is currently located according to the current geographic location information and the current time information comprises:
    finding a target time period related to a first temperature characteristic corresponding to the current geographic location information from a preset correspondence between geographic location information and time periods related to the first temperature characteristic, wherein the correspondence between the geographic location information and the time periods related to the first temperature characteristic indicates that a region corresponding to each piece of geographic location information is in an environment having the first temperature characteristic during the corresponding time period related to the first temperature characteristic;
    determining whether the current time information matches the target time period related to the first temperature characteristic;
    in a case that the current time information matches the target time period related to the first temperature characteristic, determining that the current temperature characteristic of the environment where the terminal is currently located is the first temperature characteristic;
    in a case that the current time information does not match the target time period related to the first temperature characteristic, determining that the current temperature characteristic of the environment where the terminal is currently located is a second temperature characteristic.

2. The method according to claim 1, wherein determining the target full charging voltage matching the current temperature characteristic comprises:
    in a case that the temperature characteristic is a first temperature characteristic, determining a difference between an initial full charging voltage of the battery and a specified value as the target full charging voltage matching the current temperature characteristic;
    in a case that the temperature characteristic is a second temperature characteristic, determining the initial full charging voltage of the battery as the target full charging voltage matching the current temperature characteristic.

3. The method according to claim 1, wherein prior to finding the target time period related to the first temperature characteristic corresponding to the current geographic location information from the preset correspondence between the geographic location information and the time periods related to the first temperature characteristic, the method further comprises:
    determining whether the correspondence is stored locally;
    in response to the correspondence not being stored locally, obtaining and storing the correspondence from a cloud server.

4. The method according to claim 1, wherein determining the current temperature characteristic of the environment where the terminal is currently located according to the current geographic location information and the current time information comprises:
    obtaining temperature information of a target region indicated by the current geographic location information under the current time information based on the current geographic location information and the current time information;
    determining the current temperature characteristic of the environment where the terminal is currently located based on the temperature information.

5. The method according to claim 1, wherein in a case that the temperature characteristic is a first temperature characteristic, the method comprises:
    reducing power consumption of the terminal to reduce temperature of the terminal.

6. A terminal, comprising:
    a processor;
    a memory for storing instructions executable by the processor; and
    wherein when the instructions executed by the processor, a method for charging a battery is implemented and the processor is configured to,
    detect current geographic location information and current time information of the terminal;
    determine a current temperature characteristic of an environment where the terminal is currently located according to the current geographic location information and the current time information;
    determine a target full charging voltage matching the current temperature characteristic, and charge a battery of the terminal with the target full charging voltage, wherein different full charging voltages match with different temperature characteristics;
    wherein the processor is configured to,
    find a target time period related to a first temperature characteristic corresponding to the current geographic location information from a preset correspondence between geographic location information and time periods related to the first temperature characteristic, wherein the correspondence between the geographic location information and the time periods related to the first temperature characteristic indicates that a region corresponding to each piece of geographic location information is in an environment having the first temperature characteristic during the corresponding time period related to the first temperature characteristic;

determine whether the current time information matches the target time period related to the first temperature characteristic;

in a case that the current time information matches the target time period related to the first temperature characteristic, determine that the current temperature characteristic of the environment where the terminal is currently located is the first temperature characteristic;

in a case that the current time information does not match the target time period related to the first temperature characteristic, determine that the current temperature characteristic of the environment where the terminal is currently located is a second temperature characteristic.

7. The terminal according to claim 6, wherein the processor is configured to, in a case that the temperature characteristic is a first temperature characteristic, determine a difference between an initial full charging voltage of the battery and a specified value as the target full charging voltage matching the current temperature characteristic;

in a case that the temperature characteristic is a second temperature characteristic, determine the initial full charging voltage of the battery as the target full charging voltage matching the current temperature characteristic.

8. The terminal according to claim 6, the processor is configured to, prior to finding the target time period related to the first temperature characteristic corresponding to the current geographic location information from the preset correspondence between the geographic location information and the time periods related to the first temperature characteristic, determine whether the correspondence is stored locally, and in response to the correspondence not being stored locally, obtain and store the correspondence from a cloud server.

9. The terminal according to claim 6, the processor is configured to, obtain temperature information of a target region indicated by the current geographic location information under the current time information based on the current geographic location information and the current time information;

determine the current temperature characteristic of the environment where the terminal is currently located based on the temperature information.

10. The terminal according to claim 6, the processor is configured to, in a case that the temperature characteristic is a first temperature characteristic, reduce power consumption of the terminal to reduce temperature of the terminal.

11. A non-transitory computer readable storage medium having a computer program stored thereon, wherein the program is configured to cause a processor to execute a method for charging a battery, and the method includes:

detecting current geographic location information and current time information of a terminal;

determining a current temperature characteristic of an environment where the terminal is currently located according to the current geographic location information and the current time information;

determining a target full charging voltage matching the current temperature characteristic, and charging a battery of the terminal with the target full charging voltage, wherein different full charging voltages match with different temperature characteristics;

wherein determining the current temperature characteristic of the environment where the terminal is currently located according to the current geographic location information and the current time information comprising:

finding a target time period related to a first temperature characteristic corresponding to the current geographic location information from a preset correspondence between geographic location information and time periods related to the first temperature characteristic, wherein the correspondence between the geographic location information and the time periods related to the first temperature characteristic indicates that a region corresponding to each piece of geographic location information is in an environment having the first temperature characteristic during the corresponding time period related to the first temperature characteristic;

determining whether the current time information matches the target time period related to the first temperature characteristic;

in a case that the current time information matches the target time period related to the first temperature characteristic, determining that the current temperature characteristic of the environment where the terminal is currently located is the first temperature characteristic;

in a case that the current time information does not match the target time period related to the first temperature characteristic, determining that the current temperature characteristic of the environment where the terminal is currently located is a second temperature characteristic.

12. The storage medium according to claim 11, wherein determining the target full charging voltage matching the current temperature characteristic comprising:

in a case that the temperature characteristic is a first temperature characteristic, determining a difference between an initial full charging voltage of the battery and a specified value as the target full charging voltage matching the current temperature characteristic;

in a case that the temperature characteristic is a second temperature characteristic, determining the initial full charging voltage of the battery as the target full charging voltage matching the current temperature characteristic.

13. The storage medium according to claim 11, wherein prior to finding the target time period related to the first temperature characteristic corresponding to the current geographic location information from the preset correspondence between the geographic location information and the time periods related to the first temperature characteristic, the method further comprises:

determining whether the correspondence is stored locally;

in response to the correspondence not being stored locally, obtaining and storing the correspondence from a cloud server.

14. The storage medium according to claim 11, wherein determining the current temperature characteristic of the environment where the terminal is currently located according to the current geographic location information and the current time information comprises:

obtaining temperature information of a target region indicated by the current geographic location information under the current time information based on the current geographic location information and the current time information;

determining the current temperature characteristic of the environment where the terminal is currently located based on the temperature information.

15. The storage medium according to claim 11, wherein in a case that the temperature characteristic is a first temperature characteristic, the method comprises:

reducing power consumption of the terminal to reduce temperature of the terminal.

\* \* \* \* \*